United States Patent
Yoon et al.

(10) Patent No.: US 8,436,966 B2
(45) Date of Patent: May 7, 2013

(54) LIQUID CRYSTAL DISPLAY DEVICE AND MANUFACTURING METHOD THEREOF

(75) Inventors: Paik Sang Yoon, Goomi-si (KR); Lee Joon Youp, Seoul (KR)

(73) Assignee: LG Display Co., Ltd., Seoul (KR)

( * ) Notice: Subject to any disclaimer, the term of this patent is extended or adjusted under 35 U.S.C. 154(b) by 707 days.

(21) Appl. No.: 12/648,950

(22) Filed: Dec. 29, 2009

(65) Prior Publication Data

US 2010/0134725 A1 Jun. 3, 2010

Related U.S. Application Data

(62) Division of application No. 11/289,034, filed on Nov. 29, 2005, now Pat. No. 7,719,637.

(30) Foreign Application Priority Data

Jun. 27, 2005 (KR) ................................ 2005/055519

(51) Int. Cl.
*G02F 1/1333* (2006.01)

(52) U.S. Cl.
USPC ......................................................... 349/110

(58) Field of Classification Search .................. 349/106, 349/110, 158
See application file for complete search history.

(56) References Cited

U.S. PATENT DOCUMENTS

| | | | |
|---|---|---|---|
| 4,297,004 A | 10/1981 | Nishimura et al. | |
| 4,721,365 A | 1/1988 | Nishimura | |
| 5,058,997 A | 10/1991 | Dickerson et al. | |
| 5,285,302 A | 2/1994 | Wu | |
| 5,708,483 A | 1/1998 | Asai | |
| 5,731,860 A | 3/1998 | Harada et al. | |
| 5,739,887 A | 4/1998 | Ueda et al. | |
| 5,771,085 A | 6/1998 | Ochi et al. | |
| 6,307,613 B1 | 10/2001 | Iida | |
| 7,102,724 B2 * | 9/2006 | Yi et al. ........................ | 349/158 |

FOREIGN PATENT DOCUMENTS

| | | |
|---|---|---|
| JP | 63-113421 | 5/1988 |
| JP | 05-107518 | 4/1993 |
| JP | 10-282464 | 10/1998 |
| JP | 2000-066179 | 3/2000 |
| JP | 2000-147485 | 5/2000 |
| JP | 2000-221462 | 8/2000 |
| JP | 2002-174803 | 6/2002 |

OTHER PUBLICATIONS

First Office Action for corresponding Chinese Patent Application Serial No. 2005101304433, dated Dec. 14, 2007.
Office Action dated Feb. 10, 2009 for Japanese Patent No. 2005-356399.

* cited by examiner

*Primary Examiner* — James Dudek
(74) *Attorney, Agent, or Firm* — Brinks Hofer Gilson & Lione

(57) ABSTRACT

An LCD (liquid crystal display device) and a manufacturing method thereof are provided. The LCD includes a top substrate, a bottom substrate, and an alignment mark for aligning a polarizing plate on the top substrate or the bottom substrate. Also, the method includes: forming a metal layer on a substrate and forming a gate electrode, a gate line, and an alignment mark; forming a thin film transistor and a data line on the substrate with the gate electrode, the gate line, and the alignment mark; and forming a passivation layer and a pixel electrode on the substrate with a source/drain electrode.

17 Claims, 9 Drawing Sheets ial display device, and more particularly, to a liquid crystal display device capable of preventing misattachment of a polarizing plate, and a manufacturing method thereof.

LIQUID CRYSTAL DISPLAY DEVICE AND MANUFACTURING METHOD THEREOF

The present patent document is a divisional of U.S. patent application Ser. No. 11/289,034, filed Nov. 29, 2005, which claims priority to Korean Patent Application No. 055519/2005 filed in Korea on Jun. 27, 2005, which is hereby incorporated by reference.

BACKGROUND

1. Field of the Invention

The present invention relates to a liquid crystal display device, and more particularly, to a liquid crystal display device capable of preventing misattachment of a polarizing plate, and a manufacturing method thereof.

2. Discussion of the Related Art

Since liquid crystal display devices (LCDs) have low power consumption and high portability through integrated technology, they are considered as a next generation of high-tech display device. The LCD is an image display device that includes liquid crystal injected between an array substrate and a color filter substrate. The array substrate includes thin film transistors (TFTs). The LCD displays an image by using a light refractive index difference according to liquid crystal anisotropy.

An active matrix liquid crystal display (AMLCD) is mainly used in a flat display field. One thin film transistor is used as a switching element to change light transmittance by controlling a voltage applied to the liquid crystal of one pixel. Amorphous silicon:H (hereinafter, referred to as amorphous silicon) is mainly used for a TFT because it can be easily manufactured in a large size.

In manufacturing the LCD, red (R), green (G) and blue (B) color filters are sequentially formed on a top substrate using photolithography, a thin film transistor as a switching element and pixel electrodes are sequentially formed on a bottom substrate using photolithography, and the top substrate and the bottom substrate are attached to each other. Then, an LCD is formed by injecting liquid crystals.

A spacer is dispersed between the substrates to maintain a cell gap between the top substrate and the bottom substrate, and a seal printing process is performed to attach the top substrate and the bottom substrate and seal the liquid crystals.

The subsequent processes after the attachment process will now be described. FIG. 1 is a schematic view illustrating a related art manufacturing process of an LCD.

Referring to FIG. 1, a seal is printed on a TFT with a thin film transistor, and a spacer is dispersed on a color filter substrate (C/F). Then, the two substrates are combined together. The attachment of the substrates is performed with heat, pressure, and ultraviolet irradiation after the TFT substrate is aligned with the color filter substrate. Then, the combined substrate is cut into cells.

When the cell process is completed, liquid crystal is injected into each liquid crystal cell. Then, the injection hole is sealed after the injection process using an ultraviolet hardening resin. A polarizing plate is attached to the liquid crystal cell after liquid crystal is injected into the liquid crystal cell. Attachment of the polarizing plate is performed to press the polarizing plate to the liquid crystal cell using a roller after the polarizing plate is aligned with a liquid crystal surface.

The polarizing plate plays a role in selectively transmitting light polarized in a predetermined direction from light passing through the liquid crystal. The image quality of the LCD display deteriorates if the polarizing plate is not precisely attached to the liquid crystal cell.

After a top polarizing plate and a bottom polarizing plate are attached to the liquid crystal cell, a defect test is applied. The defect test includes determining the lighting status of the liquid crystal cell and whether or not stains are present. The defect test is performed by applying a test signal to a pad region of the liquid crystal cell. Then, a finished LCD is completed by attaching a circuit substrate to the liquid crystal cell.

However, referring to FIG. 2, misattachment of the polarizing plate 15 frequently occurs in the related art process of attaching a polarizing plate. This occurs as there is often misalignment between the liquid crystal cell 10 and the polarizing plate 15 before the polarizing plate 15 is attached to the liquid crystal cell 10.

FIG. 2 is a plan view illustrating a related art misattachment of a polarizing plate during the process of attaching a polarizing plate. As shown, the polarizing plate 15 is attached to an active area 11 of an image display region, but is tilted during the attachment process.

The misattachment of the polarizing plate occurs because an alignment reference of the polarizing plate 15 and the liquid crystal cell 10 is ambiguous, and the attachment process is performed using a roller right after the polarizing plate 15 is mechanically aligned with the liquid crystal 10. In particular, it is difficult to detect twisting of the polarizing plate when the polarizing plate is attached to the active area 11 of the liquid crystal cell 10.

BRIEF SUMMARY

By way of introduction only, as embodied and broadly described herein, there is provided an LCD including a top substrate, a bottom substrate, a polarizing plate on the top and/or bottom substrate and a liquid crystal layer between the top substrate and the bottom substrate. The top and/or bottom substrate contains an alignment mark. The polarizing plate is aligned with the alignment mark.

In another aspect of the present invention, a method for manufacturing an LCD is provided. The method includes: forming a layer on a first substrate; etching the layer to form an alignment mark; aligning a polarizing plate on the first substrate using the alignment mark and attaching the aligned polarizing plate to the first substrate; attaching the first substrate to a second substrate; and providing liquid crystal to the first and/or second substrates.

In another embodiment, an LCD (liquid crystal display device) includes color filter and TFT substrates, the first and second polarizing plates on the substrates, and liquid crystal between the substrates. The color filter substrate includes a color filter layer, a black matrix, and a first alignment mark. The first alignment mark is formed along a perimeter of and/or at a corner of an active area in the color filter substrate. The TFT substrate includes gate and data lines, TFTs, pixel electrodes, and a second alignment mark. The second alignment mark is formed along a perimeter of and/or at a corner of an active area in the TFT substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE DRAWINGS AND THE PRESENTLY PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
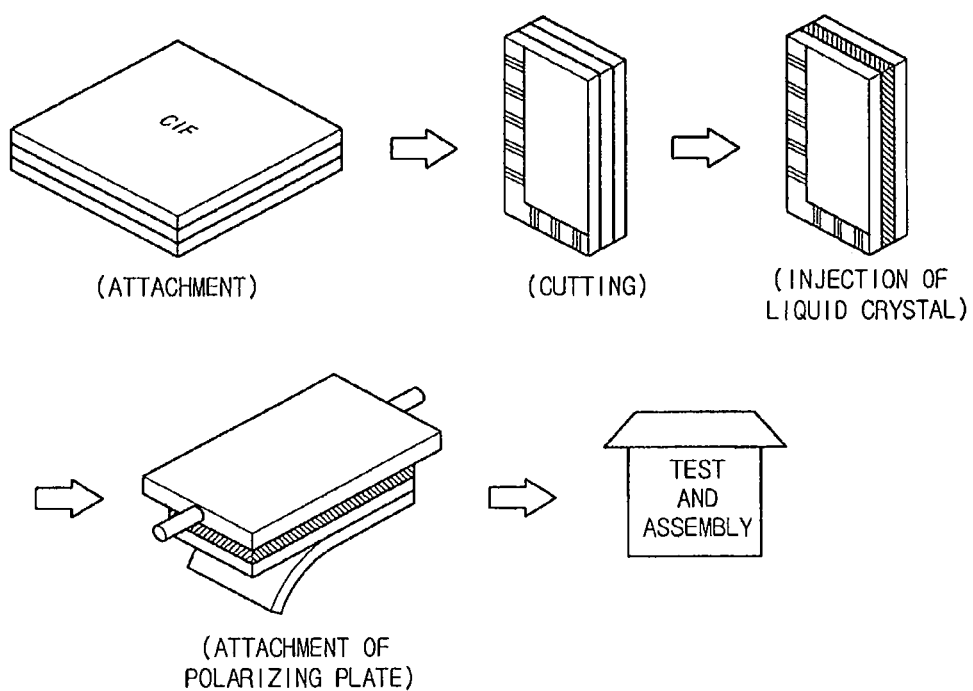
FIG. 1 is a schematic view illustrating a related art manufacturing process of an LCD.
Figure 2:
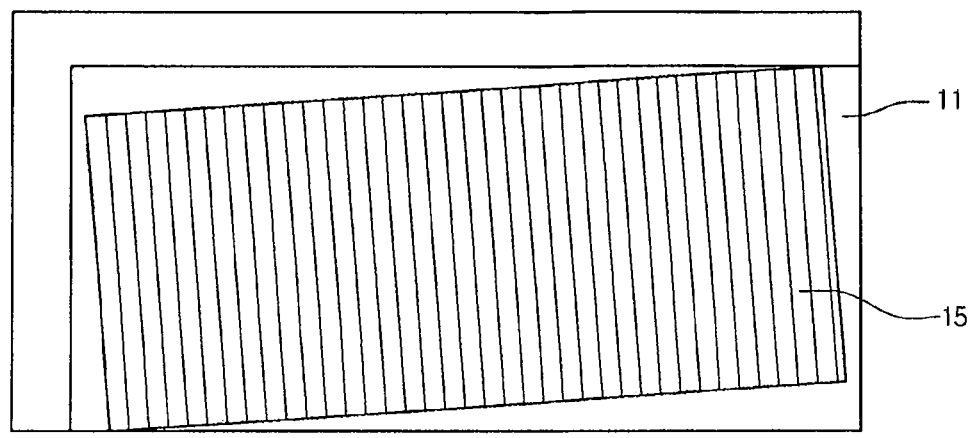
FIG. 2 is a plan view illustrating an attachment defect of a polarizing plate during a process of attaching a polarizing plate according to the related art.
Figure 3:
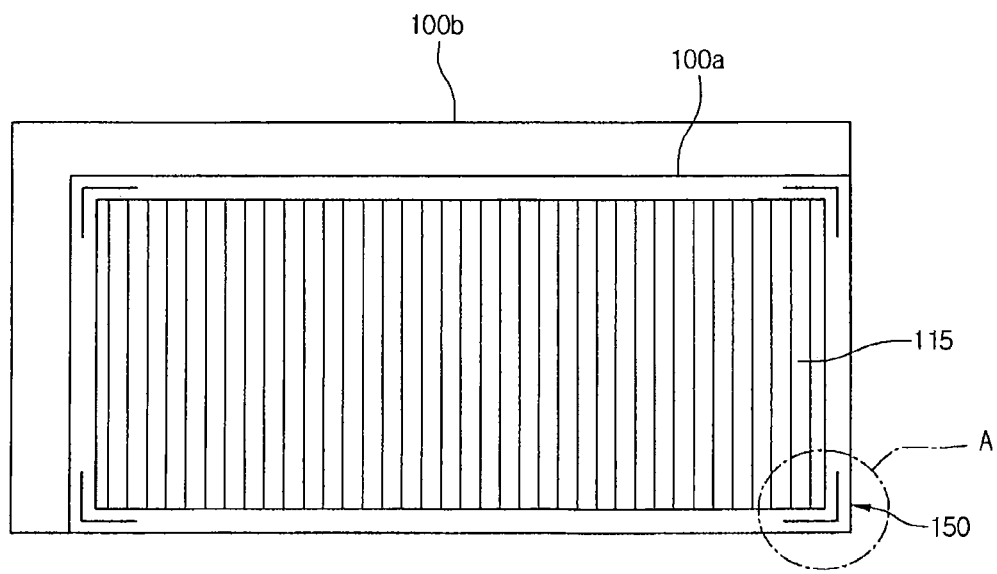
FIG. 3 is a plan view of a polarizing plate attached to an LCD with an alignment mark according to an embodiment of the present invention.

FIG. 3 is a plan view of a polarizing plate attached to an LCD with an alignment mark according to an embodiment of the present invention.

Referring to FIG. 3, an LCD includes a top substrate (a color filter substrate) 100a having R, G and B color filters, a bottom substrate 100b having pixel electrodes and TFTs, and a liquid crystal layer interposed between the top substrate 100a and the bottom substrate 100b. Also, a polarizing plate 150 is attached to a liquid crystal cell 100 formed by attaching the top substrate 100a and the bottom substrate 100b.

An alignment mark 150 is formed in a corner region of the top substrate 100a. The alignment mark 150 permits alignment of the polarizing plate 115 during attachment of the polarizing plate 115 to the liquid crystal cell 100. The alignment mark can be formed in a black matrix region outside an active area of the top substrate 100a, or can be formed in a corner region in an active area of the bottom substrate 100b. That is, the alignment mark 150 can be formed on the top substrate 100a or the bottom substrate 100b of the liquid crystal cell 100. The alignment mark 150 is formed in a '┐'-shape to align with a corner of the polarizing plate 115.

Figure 4:
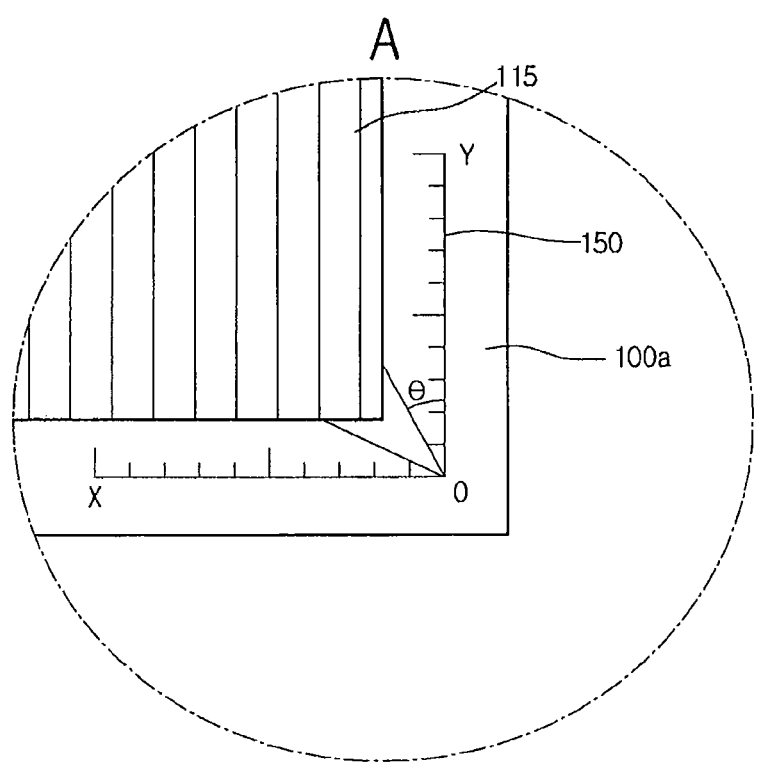
FIG. 4 is an enlarged view of a portion A in FIG. 3.

FIG. 4 is an enlarged view of a portion A in FIG. 3. The alignment mark 150 has a calibrated gauge with a predetermined interval on an x-axis and a y-axis, and is divided with a predetermined angle (θ) inside the x-axis and the y-axis.

Correction of the tilt and alignment are performed with respect to the calibrated gauge when the polarizing plate 115 is attached to the top substrate 100a or the bottom substrate 100b of the liquid crystal cell 100. Misalignment includes tilting that can frequently occur during attachment of the polarizing plate 115 to the top substrate 100a or the bottom substrate 100b of the liquid crystal cell 100. This misalignment can be prevented by aligning a corner of the polarizing plate 115 with the calibrated gauge of the x-axis and the y-axis or the angle θ.

Figure 5:
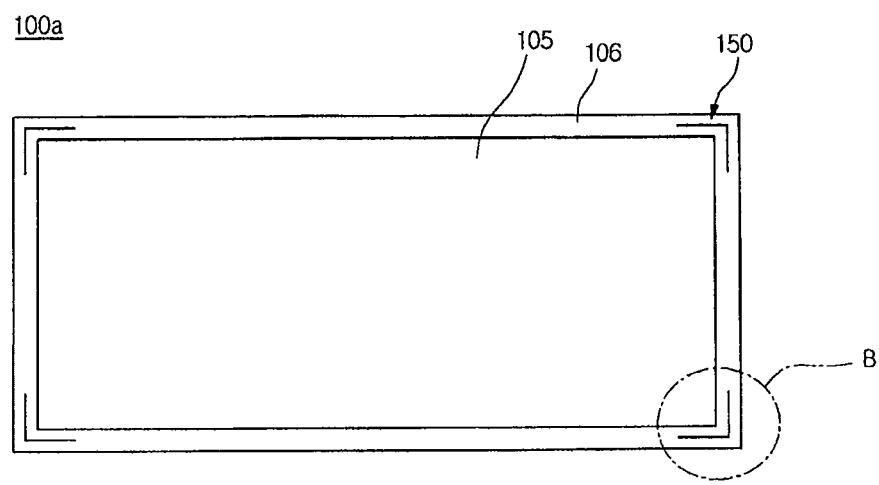
FIG. 5 is a plan view illustrating a top substrate of a liquid crystal cell with an alignment mark according to an embodiment of the present invention.

FIG. 5 is a plan view illustrating the top substrate of the liquid crystal cell with the alignment mark according to an embodiment of the present invention. The alignment mark 150 is formed on the corner of an active area 105 in the top substrate 100a so as enable precise attachment of the polarizing plate 115 thereto. The alignment mark 150 is formed by patterning a black matrix 106 of the top substrate 100a.

Although four alignment marks 150 are illustrated in the corners of the active area 105, more alignment marks 150 can also be formed along the corners of the active area 105. Since the alignment mark 150 is formed together with the black matrix during manufacturing of the LCD, additional processes may be avoided in formation of the alignment mark 150.

Figure 6A:
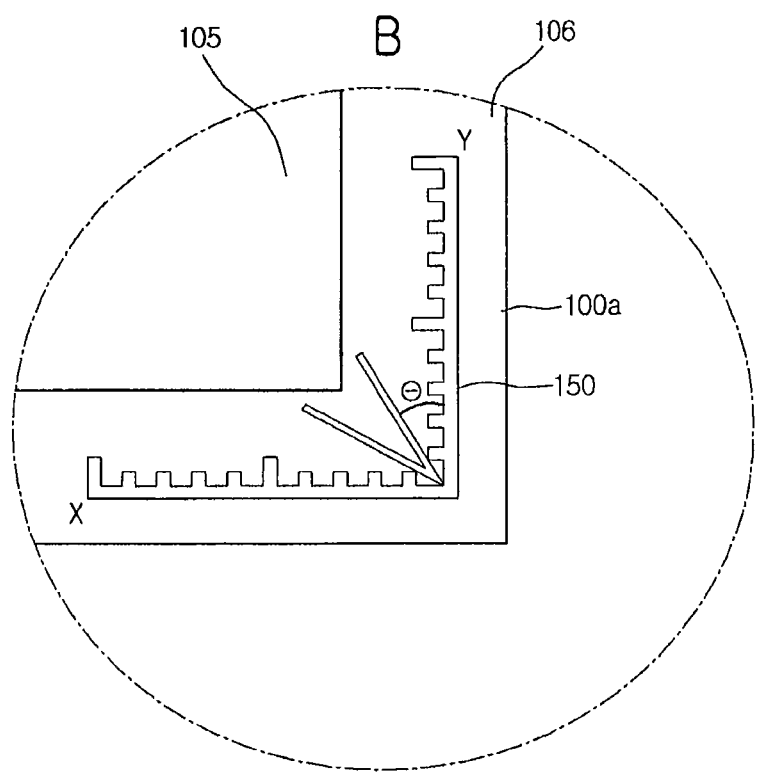
FIGS. 6A and 6B are enlarged views of a portion B in FIG. 5.
Figure 6B:
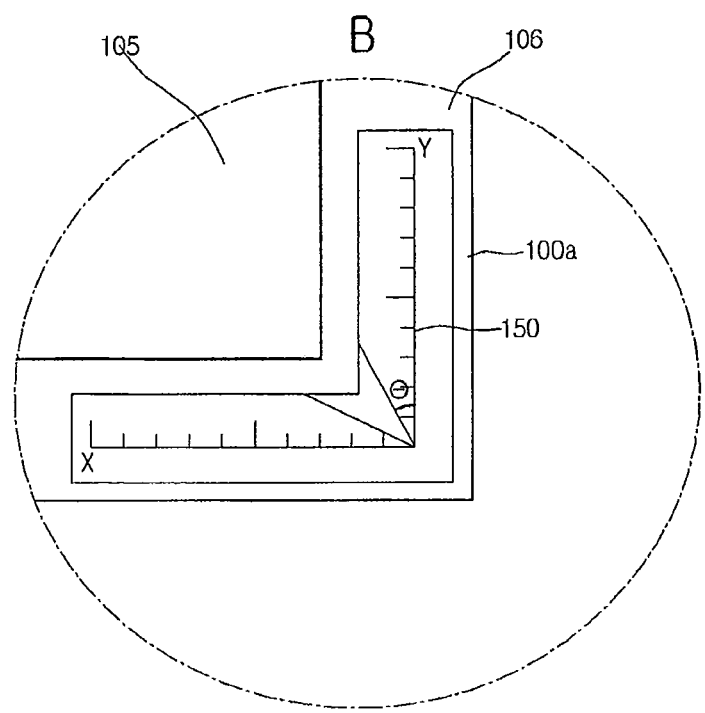

FIGS. 6A and 6B are enlarged views of a portion B in FIG. 5.

Referring to FIGS. 6A and 6B, the alignment mark 150 is formed together when the black matrix 106 is formed on the top substrate 100a. After chrome (Cr) or resin material is formed on the glass, the black matrix 106 is formed by photolithography. The black matrix 106 is formed in a lattice shape in an active area 105 of the top substrate 100a, and is formed thickly enough to have a predetermined width for preventing light leakage around the corners.

Referring to FIG. 6A, when the black matrix 106 is formed, the alignment mark 150 is formed in an engraved shape with glass exposed by etching and patterning the black matrix 106. That is, the alignment mark 150 is patterned when the black matrix 106 is patterned according to a photo process. Referring to FIG. 6A, the alignment mark 150 is formed to expose the transparent glass forming the top substrate 100a by etching the black matrix 106. Accordingly, the alignment mark 150 and the angle θ are formed in a glass region that is exposed by an etching process.

However, referring to FIG. 6B, after etching the alignment mark region, the alignment mark 150 can be formed of a material of the black matrix 106 in an embossed shape. At this time, the calibrated gauge and the angle θ on the x-axis and the y-axis are formed of the material as the black matrix 106. When the black matrix 106 is formed on a glass, a color filter layer is formed in the active area 105 by using R, G, and B color resins. Misattachment of the polarizing plate can be prevented by forming the alignment mark 150 on the top substrate 100a with the color filter layer so as to align the polarizing plate 115. The polarizing plate 115 is then attached to the liquid crystal cell 100.

Figure 7:
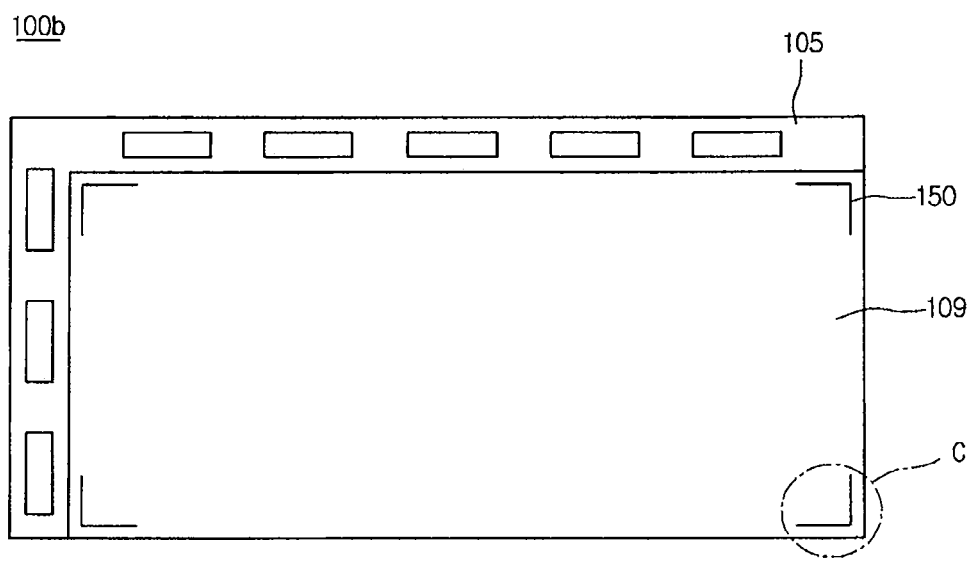
FIG. 7 is a plan view illustrating a bottom substrate of a liquid crystal cell with an alignment mark according to an embodiment of the present invention.
Figure 8:
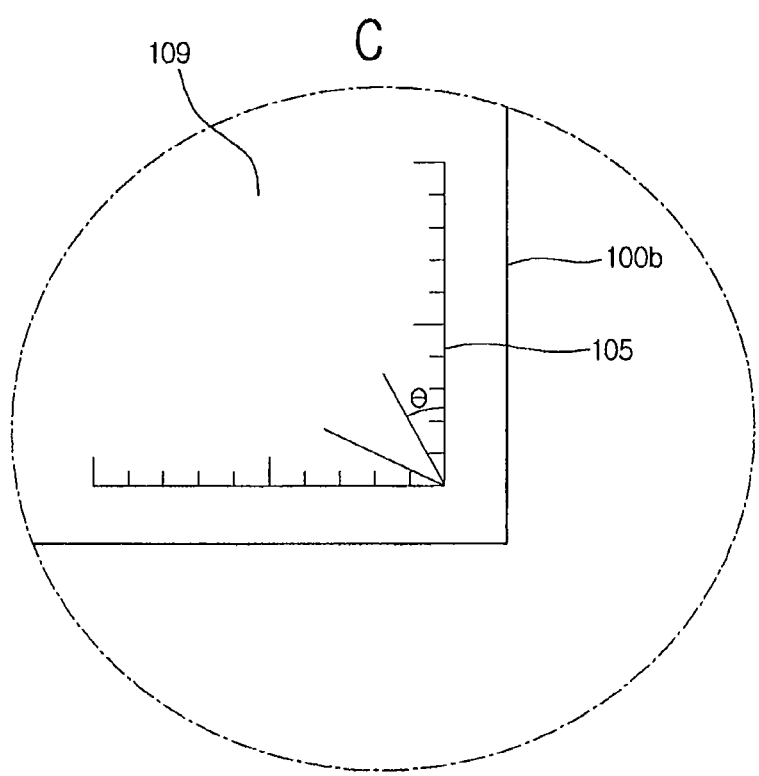
FIG. 8 is an enlarged view of a portion C in FIG. 7.

FIG. 7 is a plan view illustrating the bottom substrate of the liquid crystal cell with the alignment mark according to an embodiment of the present invention. FIG. 8 is an enlarged view of a portion C in FIG. 7.

Referring to FIGS. 7 and 8, the alignment mark 150 prevents misalignment when attaching the polarizing plate 115 on the bottom substrate 100b, which has the TFTs and the pixel electrodes. The alignment mark 150 is formed on the corner region of the active area 109 with the TFTs and the pixel electrodes inside a pad region. That is, the alignment mark 150 is formed on the bottom substrate 100b corresponding to the region in which the alignment mark is formed in FIG. 5.

The alignment mark 150 is formed on the bottom substrate 100b when a gate line or data line is formed in manufacturing the bottom substrate 100b. That is, when a metal layer from which a gate line, a gate electrode, and/or a gate pad are formed on the glass substrate, the alignment mark 150 is formed by patterning a metal layer in the corner region of the active area 109. The alignment mark 150 is formed in a '┐'-shape.

Next, a thin film transistor, a data line, and a data pad are formed by forming an active layer and source/drain electrodes. Additionally, the active layer includes a gate insulating layer, a channel layer, and an ohmic contact layer.

The alignment mark 150 can be formed during formation of the source/drain electrode, the data line, and/or the data pad. In this case, the alignment mark 150 is not formed during formation of the gate line but is formed by patterning a metal layer during formation of the data line.

Accordingly, the alignment mark 150 is formed of a source/drain electrode metal, and is a '┐'-shaped structure in a corner of an active area 109. Additionally, the alignment mark 150 is formed in each corner of the active area 109. However, a plurality of alignment marks can be formed along with the perimeter of the active area 109.

After the source/drain electrodes and the data line are formed, the bottom substrate (the TFT substrate) 100b is completed by forming a passivation layer and a pixel electrode. Accordingly, the alignment mark 150 can prevent misalignment and tilting of the polarizing plate 115 during the attachment process because the angle θ and the calibrated gauge on the x-axis and the y-axis are formed to align the polarizing plate 115.

Figure 9:
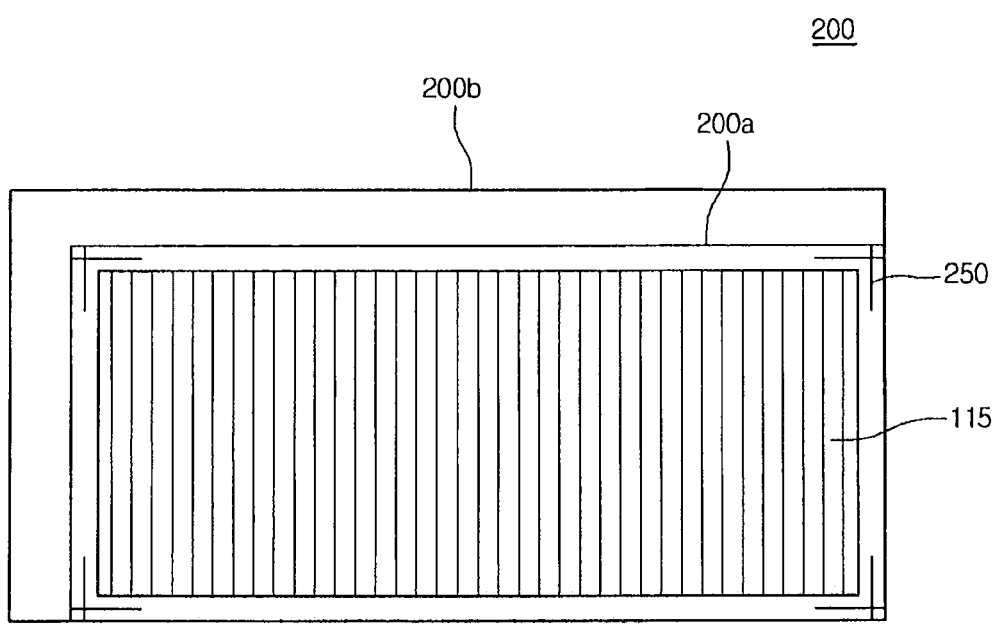
FIG. 9 is a plan view of an LCD according to another embodiment of the present invention.

FIG. 9 is a plan view of an LCD according to another embodiment of the present invention.

Referring to FIG. 9, an alignment mark 250 prevents misalignment when attaching a polarizing plate 115 to a liquid crystal panel. A top substrate 200a includes a color filter layer and a black matrix, and a bottom substrate 200b includes TFTs and pixel electrodes. The liquid crystal panel 200 is formed by attaching the top substrate 200a to the bottom substrate 200b.

Because the alignment mark 250 has a cross shape, the polarizing plate can be arranged by aligning a corner of the polarizing plate 115 with the alignment mark 250. The alignment mark 250 of FIG. 9 has a broader range of use for aligning the polarizing plate 115 than that of FIG. 3. Attachment still can be performed even if an end of the corner in the polarizing plate 115 is not disposed on the center of the cross as long as the corner of the polarizing plate 115 is overlapped with the alignment mark 250, and is vertically and horizontally aligned with the alignment mark 250.

Additionally, referring to FIGS. 6a to 8, formation of the alignment mark 250 in the cross shape is identical to formation of the top substrate 100a with the color filter and the black matrix, and the bottom substrate 100b with the TFTs and pixel electrodes. Accordingly, a description about the formation of the alignment mark 250 in the cross shape will be omitted.

The alignment mark of the polarizing plate can be used during attachment of the polarizing plate, and during attachment of other plates such as an optical sheet and a light guide plate in manufacturing the LCD. Accordingly, misalignment that frequently occurs during attachment of the polarizing plate, such as relative tilting between the polarizing plate and the substrate, can be prevented by forming an alignment mark to permit precise alignment of the polarizing plate with the LCD and accurately attach the polarizing plate to the liquid crystal cell.

It will be apparent to those skilled in the art that various modifications and variations can be made in the present invention. Thus, it is intended that the present invention covers the modifications and variations of this invention provided they come within the scope of the appended claims and their equivalents.

The invention claimed is:

1. An LCD (liquid crystal display device) comprising:
   a top substrate;
   a bottom substrate, at least one of the top or bottom substrates containing an alignment mark;
   a polarizing plate on the at least one of the top or bottom substrates and aligned such that the polarizing plate is aligned with the alignment mark; and
   a liquid crystal layer between the top substrate and the bottom substrate,
   wherein the alignment mark comprises an angle mark, and an x-axis and a y-axis perpendicular to each other,
   wherein each of the x-axis and the y-axis has a calibrated gauge with a predetermined interval, and
   wherein the angle mark is divided with the predetermined angle lines inside the x-axis and the y-axis.

2. The LCD according to claim 1, wherein the top substrate is a color filter substrate including a color filter layer and a black matrix.

3. The LCD according to claim 1, wherein the bottom substrate is a TFT substrate including pixel electrodes and TFTs (thin film transistors).

4. The LCD according to claim 2, wherein the alignment mark is formed on the top substrate using a material of the black matrix.

5. The LCD according to claim 2, wherein the alignment mark is engraved to expose a transparent material forming the top substrate by etching the black matrix.

6. The LCD according to claim 2, wherein the alignment mark is embossed by etching the black matrix.

7. The LCD according to claim 1, wherein the alignment mark comprises a perpendicularly bent shape such that the alignment mark corresponds to a corner of the polarizing plate.

8. The LCD according to claim 1, wherein the alignment mark comprises a cross shape.

9. The LCD according to claim 1, wherein a plurality of the alignment marks is formed along a perimeter of an active area in the at least one of the top and bottom substrates.

10. The LCD according to claim 1, wherein a plurality of the alignment marks is formed at corners of an active area in the at least one of the top and bottom substrates.

11. The LCD according to claim 1, wherein alignment marks are formed on both the top and bottom substrates.

12. An LCD (liquid crystal display device) comprising:
   a color filter substrate including a color filter layer, a black matrix, and a first alignment mark, the first alignment mark formed at least one of along a perimeter of or at a corner of an active area in the color filter substrate;
   a TFT substrate including gate and data lines, TFTs, pixel electrodes, and a second alignment mark, the second alignment mark formed at least one of along a perimeter of or at a corner of an active area in the TFT substrate;
   a first polarizing plate on the color filter substrate and a second polarizing plate on the TFT substrate, the first and second polarizing plates aligned with the first and second alignment mark, respectively; and
   a liquid crystal layer between the color filter substrate and the TFT substrate,
   wherein each of the first and second alignment marks comprises an angle mark, and an x-axis and a y-axis perpendicular to each other,
   wherein each of the x-axis and the y-axis has a calibrated gauge with a predetermined interval, and wherein the angle mark is divided with the predetermined angle lines inside the x-axis and the y-axis.

13. The LCD according to claim 12, wherein the first alignment mark is engraved to expose a transparent material forming the color filter substrate by etching the black matrix.

14. The LCD according to claim 12, wherein the first alignment mark is embossed by etching the black matrix.

15. The LCD according to claim 12, wherein each of the first and second alignment marks comprises a perpendicularly bent shape such that each of the first and second alignment marks corresponds to a corner of the first and second polarizing plate, respectively.

16. The LCD according to claim 12, wherein each of the first and second alignment marks comprises a cross shape.

17. The LCD according to claim 12, wherein a plurality of each of the first and second alignment marks is formed the color filter and TFT substrates, respectively.

* * * * *